(12) United States Patent
Bull et al.

(10) Patent No.: US 8,239,856 B2
(45) Date of Patent: Aug. 7, 2012

(54) SHARING UNRESOLVED INFORMATION BETWEEN SOFTWARE COMPONENTS

(75) Inventors: Brendan Bull, Durham, NC (US); Jordan Liggitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/258,867

(22) Filed: Oct. 27, 2008

(65) Prior Publication Data

US 2010/0107140 A1  Apr. 29, 2010

(51) Int. Cl.
*G06F 9/445* (2006.01)
*G06F 9/44* (2006.01)

(52) U.S. Cl. .................... 717/175; 717/132; 717/121

(58) Field of Classification Search .................. None
See application file for complete search history.

(56) References Cited

U.S. PATENT DOCUMENTS

| | | | |
|---|---|---|---|
| 6,591,272 B1 * | 7/2003 | Williams ........................ 1/1 |
| 6,689,035 B1 * | 2/2004 | Gerber ........................ 493/320 |
| 6,986,135 B2 * | 1/2006 | Leathers et al. ............ 717/177 |
| 7,203,938 B2 * | 4/2007 | Ambrose et al. ............. 717/175 |
| 7,210,096 B2 * | 4/2007 | Kearney ........................ 715/234 |
| 7,228,541 B2 * | 6/2007 | Gupton et al. ................ 717/175 |
| 7,296,263 B1 * | 11/2007 | Jacob ............................. 717/143 |
| 7,337,184 B1 * | 2/2008 | Or et al. ............................. 1/1 |
| 7,472,385 B2 * | 12/2008 | Chamberlain et al. ........ 717/175 |
| 7,490,183 B2 * | 2/2009 | Branigan et al. .............. 710/100 |
| 7,496,911 B2 * | 2/2009 | Rowley et al. ................. 717/175 |
| 7,562,346 B2 * | 7/2009 | Jhanwar et al. ............... 717/175 |
| 7,568,195 B2 * | 7/2009 | Markley et al. ................ 717/175 |
| 7,698,398 B1 * | 4/2010 | Lai ................................ 709/223 |
| 7,861,226 B1 * | 12/2010 | Episkopos et al. ............ 717/132 |
| 7,886,272 B1 * | 2/2011 | Episkopos et al. ............ 717/132 |
| 7,934,194 B2 * | 4/2011 | Kinnucan et al. ............. 717/121 |
| 7,945,898 B1 * | 5/2011 | Episkopos et al. ............ 717/132 |
| 7,971,187 B2 * | 6/2011 | Sanghvi et al. ................ 717/121 |
| 7,996,814 B1 * | 8/2011 | Qureshi et al. ................ 717/121 |
| 8,001,527 B1 * | 8/2011 | Qureshi et al. ................ 717/121 |
| 8,069,435 B1 * | 11/2011 | Lai ................................ 717/106 |
| 8,074,208 B2 * | 12/2011 | Bateman et al. ............... 717/132 |
| 8,095,911 B2 * | 1/2012 | Ronen et al. .................. 717/121 |
| 2003/0140339 A1 * | 7/2003 | Shirley et al. ................. 717/171 |
| 2006/0161895 A1 * | 7/2006 | Speeter et al. ................ 717/121 |

(Continued)

OTHER PUBLICATIONS

Bailey, "Maximum RPM Taking the Red Hat Package Manager to the Limit", 1997; [retrieved on May 31, 2011]; Retrieved from Internet <URL:http://rpm5.org/docs/max-rpm.pdf>; pp. 1-442.*

(Continued)

*Primary Examiner* — Thuy Dao
*Assistant Examiner* — Xi D Chen
(74) *Attorney, Agent, or Firm* — Patterson & Sheridan LLP (57) ABSTRACT

Techniques are disclosed which allow independent software components to share unresolved information with one another. Components may register with a component integration bus (CIB) as a provider or a consumer (or both) for a variety of different data types. The CIB may be further configured to store and share component information with users of the CIB to broker consumer-provider relationships between components included in an integrated solution package. The CIB may also validate the consumer-provider relationships between components included in such a package. Further, the CIB provides information useful to validate the solution package. Using the information from the CIB, components of the solution package are able to resolve unresolved information when the integrated solution is deployed on a remote system.

20 Claims, 7 Drawing Sheets

U.S. PATENT DOCUMENTS

| | | | |
|---|---|---|---|
| 2007/0006119 A1* | 1/2007 | Price | 717/132 |
| 2007/0101197 A1* | 5/2007 | Moore et al. | 714/38 |
| 2010/0005450 A1* | 1/2010 | Joy et al. | 717/121 |

OTHER PUBLICATIONS

Red Hat, "Red Hat Enterprise Linux 5.0.0 Red Hat Enterprise Linux Deployment Guide", 2007; [retrieved on Dec. 7, 2011]; Retrieved from Internet <URL:http://www.centos.org/docs/5/pdf/Deployment_Guide.pdf>; pp. 1-779.*

Arsanjani, et al., "SOMA: A method for developing service-oriented solutions", IBM Systems Journal, 2008; [retrieved on Mar. 23, 2012]; Retrieved from Internet <URL:http://ieeexplore.ieee.org/stamp/stamp.jsp?tp=&arnumber=5386496>; pp. 377-396.*

Flurry, Vicknair, "The IBM Application Framework for e-business", IBM Systems Journal, 2001; [retrieved on Mar. 23, 2012]; Retrieved from Internet <URL:http://ieeexplore.ieee.org/stamp/stamp.jsp?tp=&arnumber=5386960>; pp. 8-24.*

Tucker, Krishnamurthi, "Applying Module System Research to Package Management", 2010, Tenth International Workshop on Software Configuration Management; [retrieved on Mar. 23, 2012]; Retrieved from Internet <URL:http://www.cs.brown.edu/people/sk/Publications/Papers/Published/tk-prog-lang-sw-conf-mgmt/paper.pdf>; pp. 1-5.*

* cited by examiner

☐ PHP Deployment Accelerator Project ☒

Modify configuration value
Select a field to modify.

When you select a field, a dialog is displayed in which you can specify a value or specify that this field be exposed during development.

```
<?php
// ** MySQL setting ** //
define('DB_NANE', 'putyourdbnamehere');      // The name of the
define('DB_USER', 'usernamehere');           // Your MySQL usernam
define('DB_PASSWORD', 'yourpasswordhere');   // ... and passw
define('DB_HOST', 'localhost');              // 99% chance you won't n
define('DB_CHARSET', 'utf8');
define('DB_COLLATE', '');

// You can have multiple installations in one database if you
```

[<Back]  [Next>]  [Finish]  [Cancel]

SHARING UNRESOLVED INFORMATION BETWEEN SOFTWARE COMPONENTS

BACKGROUND OF THE INVENTION

1. Field of the Invention

Embodiments of the invention generally relate to sharing information between software components. More specifically, embodiments of the invention relate to a method for sharing unresolved information between software components.

2. Description of the Related Art

Independent software vendors are increasingly specialized in the products and components they produce. This specialization allows vendors to gain expertise, thereby increasing productivity and profits. Frequently, vendors work simultaneously with other vendors, and with large software companies, to create adequate application solutions in an efficient and timely manner. In creating application solutions, software components or application artifacts which are developed independently (and which are unaware of one another) may need to be integrated together. In such cases, integration techniques and solutions are necessary to allow these independent software components to work together in a complete integrated solution.

One important aspect of integration is sharing information between different software components or application artifacts included in the integrated solution. In particular, the sharing of information which may be unresolved at solution development time is often necessary. That is, a given software component may have information needed by other software components to configure their interaction with the given software component. This needed information may be unresolved until deployment on a remote computer or runtime of the solution. For example, assume a software company creates a solution that involves a database component and a Hypertext Preprocessor (PHP) component used in managing an electronic commerce website and further that the two components are independently developed by different vendors. It is important that the PHP component interact with the database component to correctly track purchases and inventory for the website. In such a case, the PHP component needs configuration information, such as a database name, a database username, a database password, and a database port to connect to the database. The database component knows this information (or at least will know the needed information at deployment). It is important for the components to share this information before the solution is used because without sharing the information the solution will not function correctly.

SUMMARY OF THE INVENTION

One embodiment of the invention includes a computer-implemented method for sharing unresolved information between software components. The method may generally include registering, with a component integration bus, a first software component as a provider of one or more predefined data types. Each predefined data type may reference information available from the first software component when deployed. The method may also include registering, with the component integration bus, a second software component as a consumer of one or more predefined data types, including registering the second software component as a consumer of at least a first data type for which the first software component is registered as a provider. The method may also include receiving a request to include at least the first software component and the second software component in an integrated solution package and brokering a consumer/provider relationship between the first software component and the second software component in the integrated solution package for the first data type. The brokering may include generating a reference to the information available from the first software component when deployed. The method may also include integrating at least the first software component, the second software component, and the generated reference into a deployable, integrated solution package.

Another embodiment of the invention may include a computer-readable storage-medium containing a program which, when executed, performs an operation for sharing unresolved information between software components. The operation may generally include registering, with a component integration bus, a first software component as a provider of one or more predefined data types. Each predefined data type references information available from the first software component when deployed. The operation may further include registering, with the component integration bus, a second software component as a consumer of one or more predefined data types, including registering the second software component as a consumer of at least a first data type for which the first software component is registered as a provider. The operation may also include receiving a request to include at least the first software component and the second software component in an integrated solution package and brokering a consumer/provider relationship between the first software component and the second software component in the integrated solution package for the first data type. The brokering itself may include generating a reference to the information available from the first software component when deployed. The operation may also include integrating at least the first software component, the second software component, and the generated reference into a deployable, integrated solution package.

Still another embodiment of the invention include a system having a processor and a memory containing a program, which, when executed by the processor, performs an operation for sharing unresolved information between software components. The operation may generally include registering, with a component integration bus, a first software component as a provider of one or more predefined data types. Each predefined data type references information available from the first software component when deployed. The operation may further include registering, with the component integration bus, a second software component as a consumer of one or more predefined data types, including registering the second software component as a consumer of at least a first data type for which the first software component is registered as a provider. The operation may also include receiving a request to include at least the first software component and the second software component in an integrated solution package and brokering a consumer/provider relationship between the first software component and the second software component in the integrated solution package for the first data type. The brokering itself may include generating a reference to the information available from the first software component when deployed. The operation may also include integrating at least the first software component, the second software component, and the generated reference into a deployable, integrated solution package.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide the ability for computer systems to share unresolved information between software components when an integrated solution package which includes multiple components is deployed (and subsequently during runtime of the integrated solution). A data sharing mechanism, referred to as a "component integration bus" (CIB), may facilitate this exchange. In one embodiment, the CIB provides a data sharing mechanism that allows entities using the CIB to establish consumer-provider relationships. For example, a PHP component may be considered a consumer of database configuration values because the PHP component uses or consumes this data. At the same time, a database component may be considered a provider of the database configuration values because the database component may provide the configuration values to the PHP component. Of course, the PHP and database components may have multiple relationships, as both providers and consumers with each other (and with a variety of other software components).

In one embodiment, a software component may provide the CIB with information about what the data types the component may provide (as a provider) or may need (as a consumer), along with metadata about this information. This information may be provided to the CIB in a predetermined format by users of the CIB. For example, an extensible markup language (XML) grammar may be defined to represent different data types which may be supplied to the CIB by a software component (as a provider) and data types which a software component may need to function properly (as a consumer). In response, the CIB may store this information and register the component as a provider of some information types and as a consumer of other information types. Further, the CIB may use the metadata regarding a given data type to allow context sensitive data provisioning. That is, an integration tool may use the metadata provided by the CIB to present some given information or data types in different ways for consumption, depending on the consuming software component. For example, the integration tool may use the metadata to store, organize, or display the information in a more efficient manner depending on context (e.g., the type of consumer or the planned deployment environment). For example, a database may use different date formats in different computing environments, e.g., a UNIX environment vs. a Microsoft® Windows® environment.

Further, the integration tool may provide a user interface with which a developer may select an appropriate provider for a given component when creating a solution package. In one embodiment, the integration tool may evaluate information provided by the CIB to determine whether including a component in a solution or deployment package is valid. That is, the CIB may be used to determine whether there is a provider component in the solution package for each data type which the component being included has registered with the CIB as a consumer. If not, the integration tool may notify the developer and, optionally, recommend a provider component. If the component being included is valid (i.e., there is a provider component available for each data type which the component has registered as a consumer), the CIB may provide information to the integration tool allowing the component to resolve the unresolved information when the package is deployed (e.g., a reference to configuration data which may be resolved at runtime/deployment).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
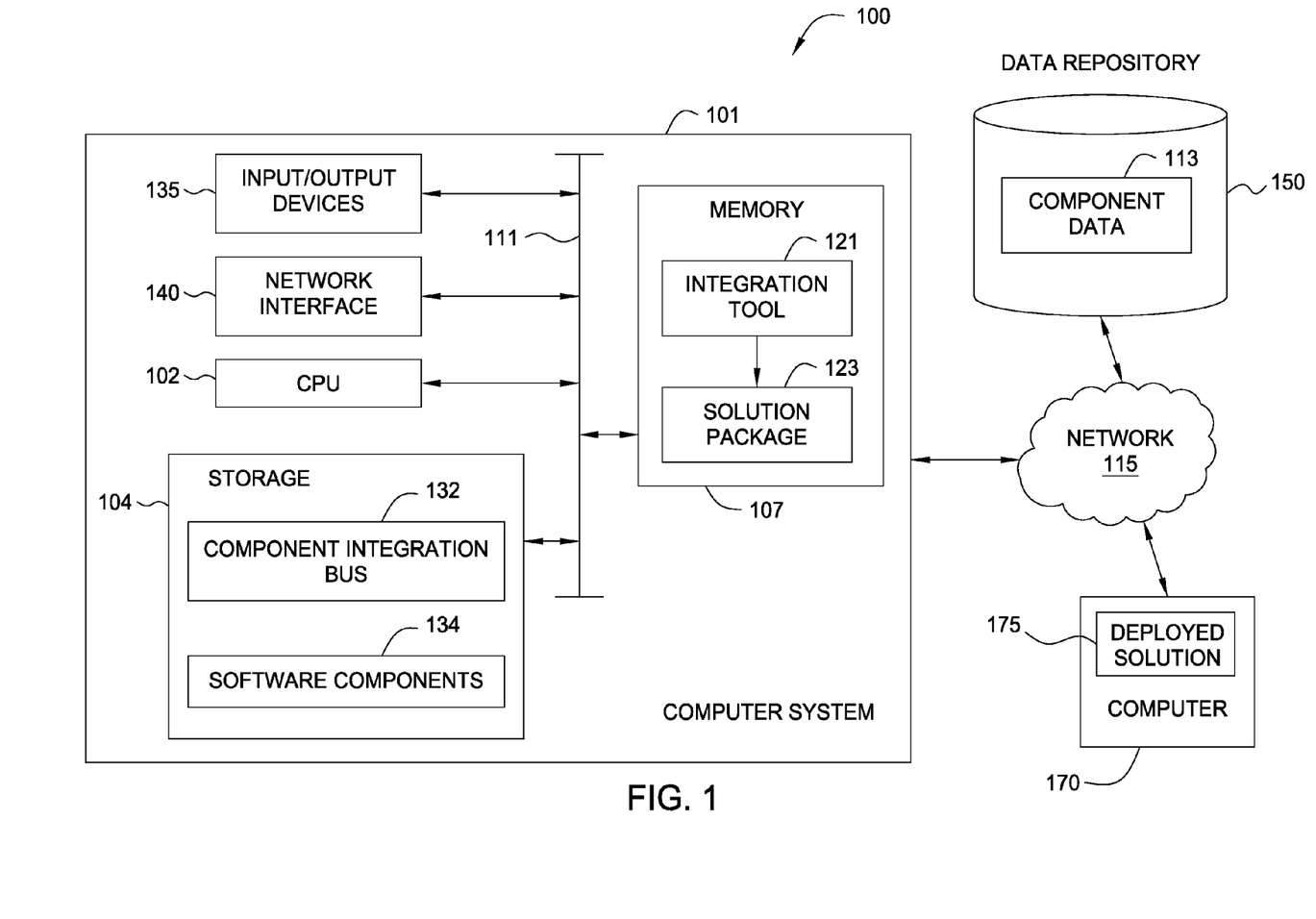
FIG. 1 is a block diagram illustrating an exemplary computing environment, according to one embodiment of the invention.

FIG. 1 is a block diagram illustrating a computing environment 100 configured according to one embodiment of the invention. In this example, a developer computer system 101 is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available. Additionally, the server computer system 101 includes input/output devices 135 such as a mouse, keyboard and monitor, as well as a network interface 140 used to connect computer system 101 to network 115.

As shown, the server computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. The server computer system 101 may be connected to a data communications network 115 (e.g., a local area network, which itself may be connected to other networks such as the internet). As shown, storage 104 includes a component integration bus (CIB) 132 and software components 136.

In one embodiment, the CIB 132 may communicate with software components 134 to facilitate consumer-provider relationships. For example, the CIB 132 may store information about software components 134 that represents what data types a given component may provide to other components (i.e., as a provider) and what information that component may need or consume from other components (as a consumer). Additionally, there may be multiple consumers for any given type of information and multiple providers for any given type of information. Further, a single component may provide types of information that are both consumed and provided. In one embodiment, different types of information (referred to as data types) used by the CIB 132 may be defined by formats contributed by the entities using the CIB 132. That is, the information or data types being shared by software components 134 may be in a predefined format (e.g., an xml schema) which may be used to store the information. The CIB 132 may also use the predefined format to present information with no actual understanding or knowledge of the information being presented. That is, the CIB 132 may act as an information broker for the predefined data types without regard to, or understanding of, what predefined data types are defined for the CIB 132.

In one embodiment, the presentation of component information is controlled by these predetermined data types. That is, the CIB 132 may recognize some common data types, e.g., WebSphere™ Application Server Properties, DB2™ Properties, MySQL™ Databases, and DB2™ Databases, to name but a few examples based on widely available commercial software components. The CIB 132 may present these data types with provider data fields (e.g., DB2™ databases may include provider fields for commonly needed information such as database name, server name, binary executable path, database ports, and the like). Software components 134 represent one or more software components or application artifacts that may be used to create an integrated solution package, ready for deployment. As described, the software components 134 may interact with the CIB 132 and an integration tool 121 and be registered as providers of some data types and consumers of other data types.

Memory 107 can be one or a combination of memory devices, including random access memory, nonvolatile or backup memory, (e.g., programmable or flash memories, read-only memories, etc.). As shown, memory 107 includes an integration tool 121 and a solution package 123. In one embodiment, the integration tool 121 may provide a software application configured to create a solution package 123. Further, the integration tool 121 may be configured to include information used at deployment to resolve information supplied by the CIB 132. For example, the CIB 132 may broker a consumer provider relationship between a PHP component and a database component being included in solution package 123. In such a case, the PHP component may need a database name and port for the database component (which is not available until the solution package 123 is deployed). Accordingly, the CIB 132 may supply a reference to the database name and port of the database component included in the package to the PHP component. Thereafter, at deployment, the PHP component may use this information to resolve an actual database name and port value. Further still, in one embodiment, the integration tool 123 may provide a software application configured to use information from the CIB 132 in evaluating whether the component ordering (e.g., the order in which components are installed on a remote system and the order in which needed information for each component is resolved) in a solution package 123 is valid. Returning to the PHP component example, above, if the developer includes the PHP component in the solution package 123, but has not included any database component, the integration tool 121 may warn the developer that no provider is available for a data type (e.g., a database name and port value) for which the PHP component has registered with the CIB 132 as a consumer.

Solution package 123 can be a solution of software components 134, including information provided by the CIB 132 and the integration tool 121. In one embodiment, solution package 123 may be deployed on a remote computer 170. That is, the solution package 123 may provide a deployable application solution composed from multiple components 134. Further, the components 134 may include references supplied by the CIB 132 to resolve at runtime.

FIG. 1 shows remote computer 170 configured to communicate with developer computer system 101 over the network 115. Of course, one of ordinary skill in the art will recognize that remote computer 170 is illustrated in a greatly simplified form so as to highlight aspects of the present invention. As shown, the remote computer 170 includes a deployed solution 175. In one embodiment, the deployed solution 175 represents a fully deployed (e.g., installed and running) solution package 123. The deployed solution 175 may include software components 134 and information from the CIB 132 and the integration tool 121. In one embodiment, software components 134 of the deployed solution 175 may use the information provided by the CIB 132 at solution development or packaging time to resolve needed or unresolved information at runtime (e.g., during deployment). Further, the information provided by the CIB 132 at solution packaging time may be stored in a data repository 150.

Figure 2:
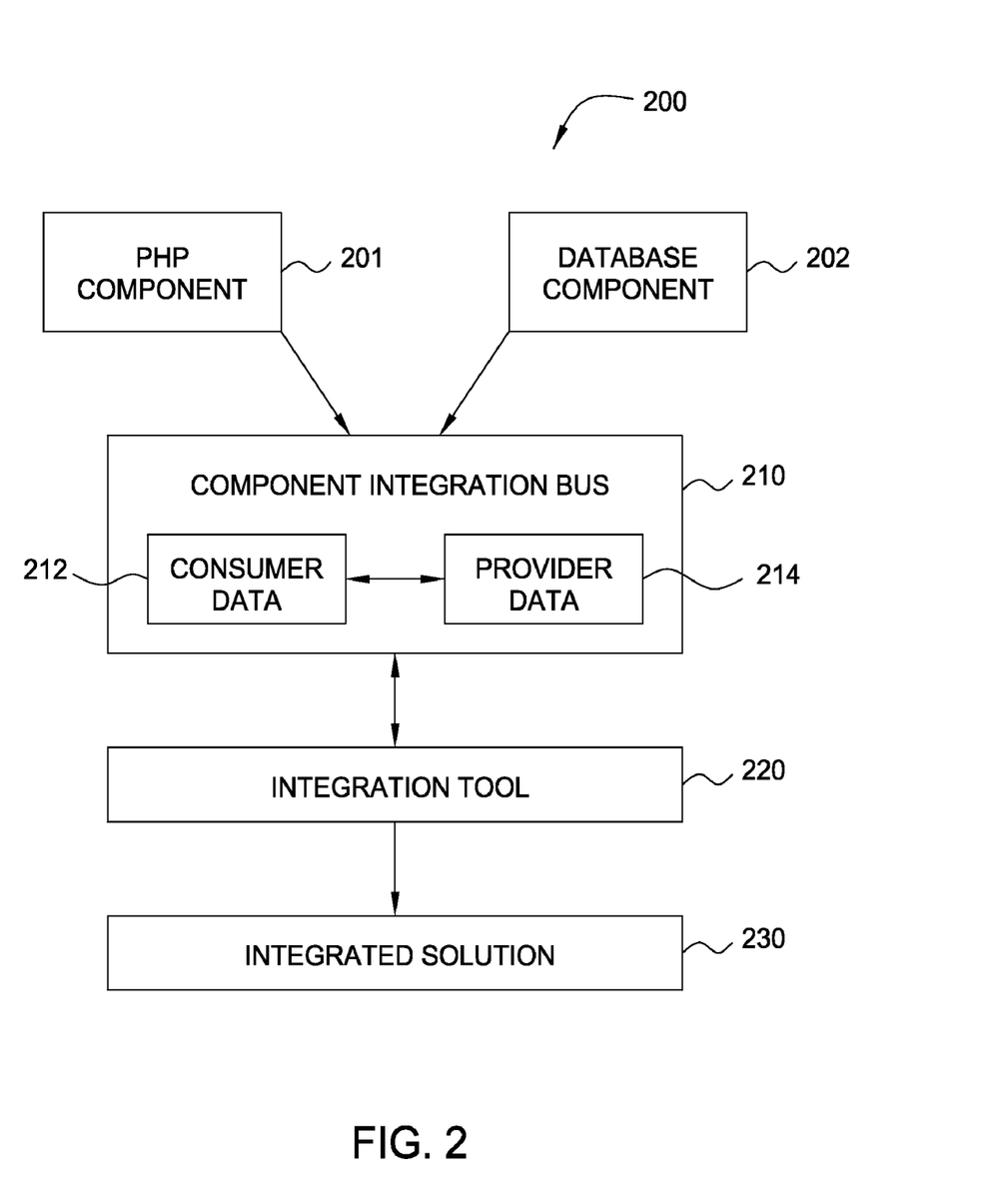
FIG. 2 illustrates an example of a solution integration which includes multiple independent software components, according to one embodiment of the invention.

Illustratively, computing environment 100 also includes a data repository 150. Data repository 150 may include component data 113. Component data 113 may include information regarding software components 134 (e.g., what information a given component may provide and what information a given component may need, along with information regarding consumer-provider relationships and related component metadata) provided by the CIB 132. As described above, the integration tool 121 and the CIB 132 may evaluate component data 113 to determine whether a solution package is valid FIG. 2 illustrates an example of a solution integration 200 which includes multiple independent software components, according to one embodiment of the invention. Illustratively, the solution integration 200 includes PHP component 201 and database component 202. PHP component 201 represents an independent software component written in the PHP programming language. Database component 202 represents another independent software component that interacts with a database management system (e.g., a mySQL™ database). One of ordinary skill in the art will recognize that the PHP component 201 and database component 202 are used for illustrative purposes and the solution integration 200 may include these and other software components (e.g., software written in other computer languages or software that interacts with other electronic resources) or any combination of such components.

As shown, component integration bus (CIB) 210 is configured to receive information from the PHP component 201 and the database component 202 and configured to communicate with an integration tool 220. In one embodiment, the CIB 210 provides a data sharing mechanism configured to allow software components to establish consumer-provider relationships. That is, the CIB 210 may store the information supplied by software components and share which information a given component provides and which information a given component needs or consumes. For example, assume a developer is creating a solution that involves database component 202 and PHP component 201 and requires these two components to interact with one another. To accomplish this interaction, the PHP component 201 needs database configuration information that database component 202 knows (or will know) at runtime. Hence, the PHP component 201 may be considered a consumer of database configuration information. Database component 202 may be considered a provider for the database configuration information because the database component 202 provides the information for consumption. Additionally, if a developer chooses the database component 202 as a provider of the database configuration information for the consumer PHP component 201, then the integration tool 220 may store such information as part of a deployable solution package. One such embodiment of a user selectable consumer-provider relationship is discussed further in FIG. 6 and FIG. 7. Alternatively, consumer-provider relationships may be programmatically selected based on some software components selected by a developer for a given solution package. For example, the integration tool 220 may include additional components in a solution package to ensure that all user-selected software components have providers for their needed information. In such a case, the integration tool may add both additional components to a given solution package and information needed to resolve a consumer provider relationship when the given solution package is deployed.

In one embodiment, the CIB 210 may validate whether a provider exists for a given consumer at solution development time (e.g., if a solution package is being created, the integration tool 220 may use the CIB 210 to determine whether a provider for some needed information of a component is already included in the solution package). The integration tool 220 may also notify the developer if no provider is available and, optionally, recommend an appropriate provider for a solution package.

Illustratively, the CIB 210 includes consumer data types 212 and provider data types 214. Consumer data types 212 represent information from software components (e.g., PHP component 201) specifying what information a given software component has registered as a consumer. Provider data types 214 represents information from software components (e.g., database component 202) specifying what information a given component has registered as a provider. As stated, the consumer data types 212 and the provider data types 214 may be connected by establishing consumer-provider relationships. The separation of the component information into the consumer data 212 and the provider data 214 is illustrated so as to highlight aspects of the present invention. One of ordinary skill in the art will appreciate the component information stored and shared by the CIB 210 may be classified, organized, presented, and stored, including physical location (e.g., the component information may be stored across a network in a data repository), in any useful manner. Additionally, one of ordinary skill in the art will appreciate that a given software component may register both provider data types 214 and consumer data types 212.

As shown, the integration tool 220 may be configured to communicate with the CIB 210. In one embodiment, the integration tool 220 may use information from the CIB 210 (e.g., consumer-provider relationships, component data types or information types about what a given component may provide or consume) to assist a developer in creating a valid solution package. The integration tool 220 may use information from the CIB 210 to inform components in a solution package how (i.e., in what order) the components should be installed. As stated, the integration tool 220 may determine an appropriate component installation order to avoid data dependency problems. That is, the integration tool 220 may include information in a solution package so that each component in the solution package may be installed and be able to resolve needed information at runtime (e.g., during deployment). In one embodiment, integrated solution 230 represents a solution package that is capable of being fully deployed, including information that allows software components in the solution package to be installed, resolve needed information, and interact with each other.

Figure 3:
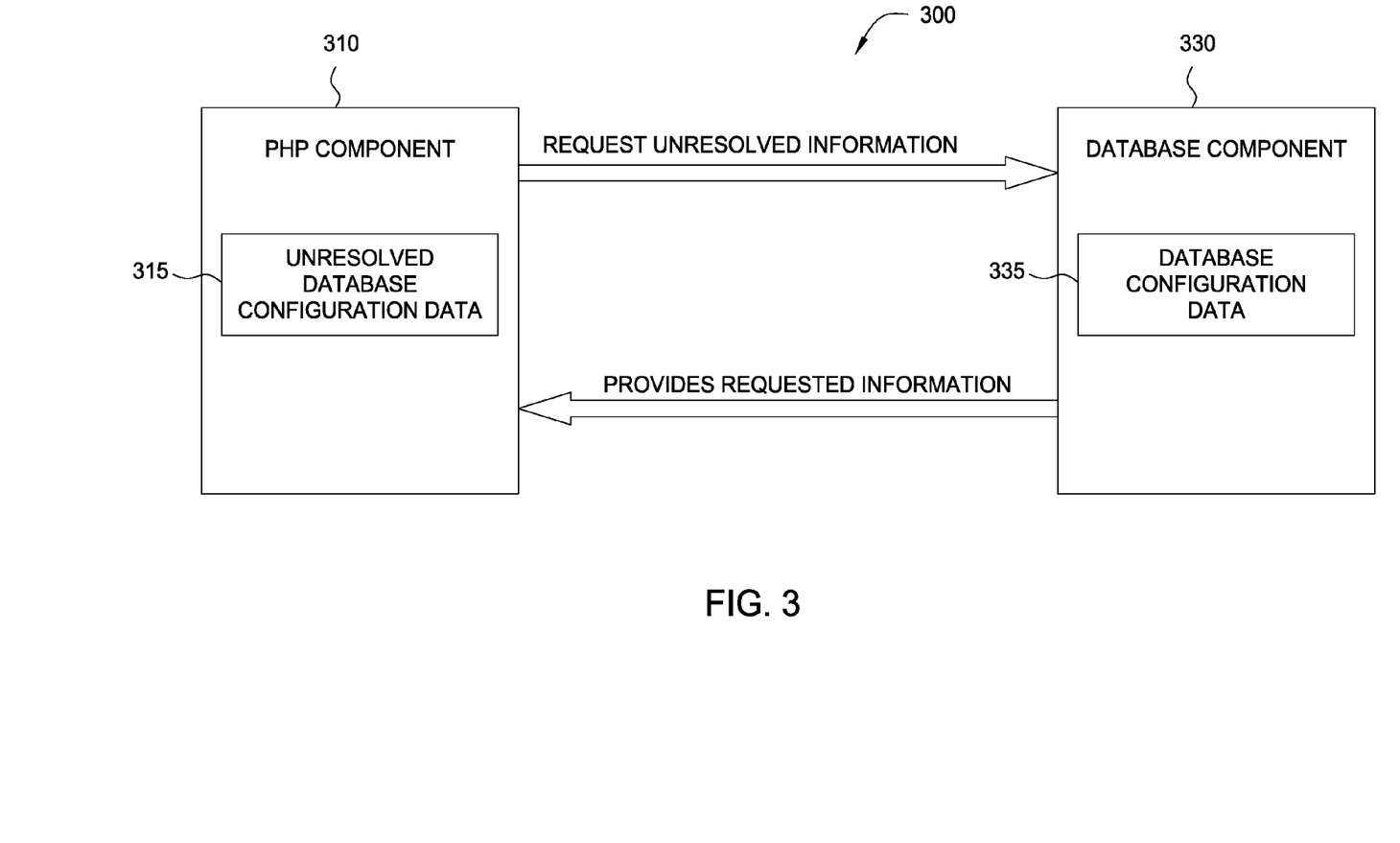
FIG. 3 is a high-level diagram illustrating an example of sharing unresolved component information between software components, according to one embodiment of the invention.

FIG. 3 is a high-level diagram illustrating an example 300 of sharing unresolved component information between software components, according to one embodiment of the invention. As shown, FIG. 3 includes a PHP component 310 and a database component 330. The PHP component 310 represents a software component written in the PHP programming language that is installed or is being installed on a remote computer 170 as part of a deployed solution 175. Illustratively, the PHP component 310 includes unresolved database configuration data (unresolved data) 315. Unresolved data 315 represents information that is unknown or unresolved until installation of the database component 330 which is also needed by the PHP component 310. For example, unresolved data 315 may include database configuration information, such as a database name, a database username, a database password, and a database port. The PHP component 310 may need this information to interact with the database component 330, and further, would be unknown until the database component 330 was installed on remote computer 170.

Database component 330 represents a software component that interacts with a database management system (e.g., a mySQL™ database) that has been installed on a remote computer 170 as part of a deployed solution 175. Database configuration data 335 represents information that is known (or will be known) at deployment/runtime by the database component 330 and is needed by the PHP component 310. At deployment, when the database configuration data 335 becomes available, the PHP component 310 may use information obtained from the CIB at development time to request unresolved information from a provider (i.e., the database component 330). For example, the CIB may provide a resolvable string to the PHP component 310 at development time (or solution packaging time). In one embodiment, a resolver string indicates what information a component needs (as a consumer) and which component in a solution package can provide that information (as a provider). Thus, the PHP component 310 may request the unresolved data 315 from the database component 330 using information in the resolver string. In response, the database component 330 may provide the requested information using the resolver string.

Figure 4:
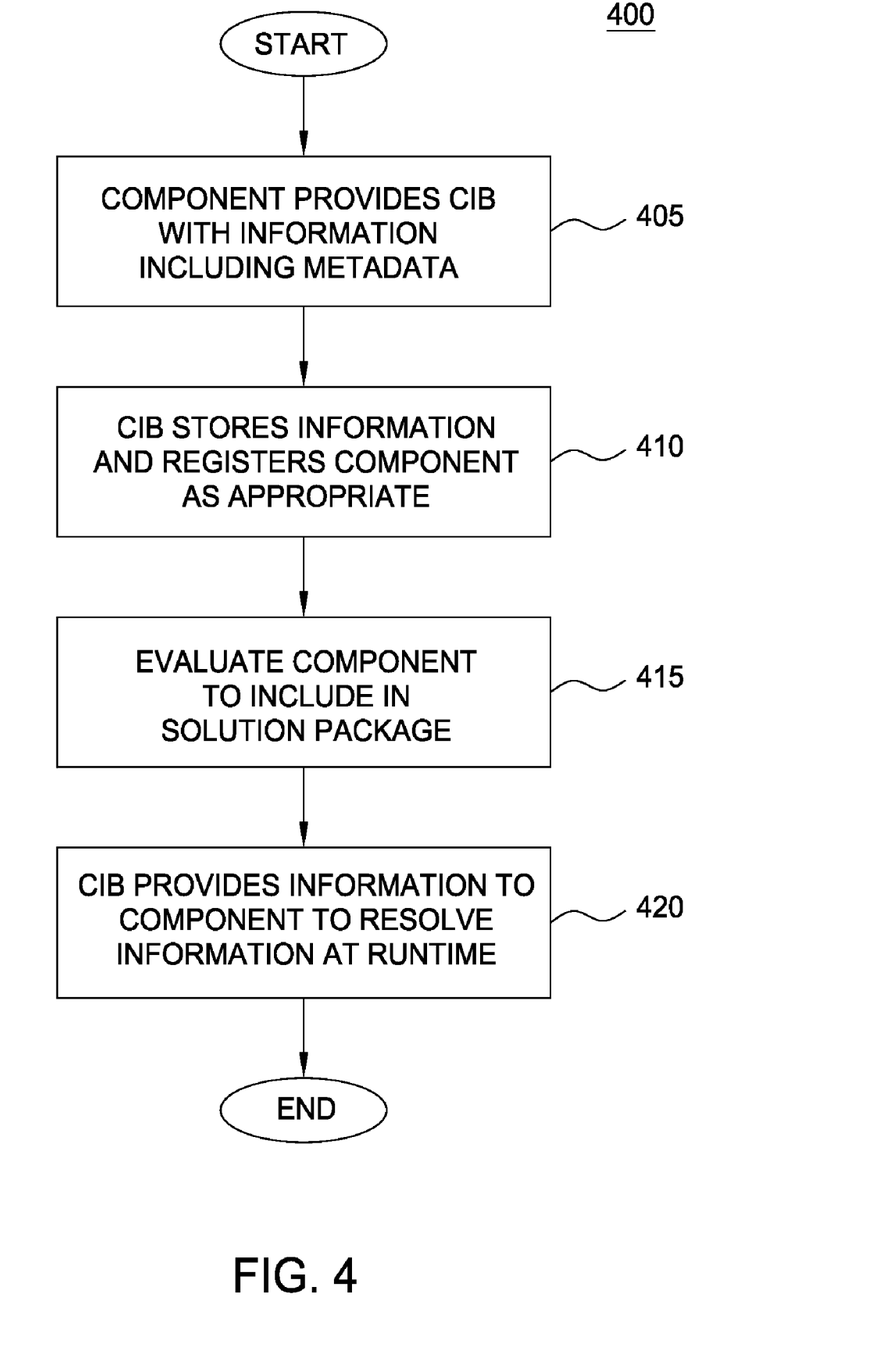
FIG. 4 is a flow diagram illustrating a method for sharing unresolved information between software components, according to one embodiment of the invention.

FIG. 4 is a flow diagram illustrating a method 400 for sharing unresolved information between software components, according to one embodiment of the invention. As shown, the method 400 begins at step 405, where a software component registers with component integration bus (CIB). In one embodiment, this may include providing information about the component, including what information the component may provide (as a provider) and may consume (as a consumer). In one embodiment, this information may be provided using a structured markup language (e.g., xml). In such a case, a schema is used to represent the different data types that a component may provide or consume and their interrelationships. Using the schema, the CIB may present component information to a developer through an integration tool without regard to, or knowledge of, the data types being defined for the CIB. The information may also include metadata about the component information. In one embodiment, the CIB may use such metadata to allow context sensitive data provisioning. That is, an integration tool may use the metadata provided by the CIB to present some given information in different ways to a developer. For example, the integration tool may use the metadata to store, organize, or display the information for consumption in a more efficient manner depending on context.

At step 410, the CIB may store the component information and register the component as a provider of some information types and as a consumer of some other information types. In one embodiment, the CIB may store this information locally. Alternatively, the CIB may store this information on a remote data repository connected by a network.

Once a suite of components has been registered with the CIB, a developer may use an integration tool to develop an integrated solution where the CIB brokers consumer provider relationships. Accordingly, at step 415, the CIB, or other software component (e.g., an integration tool), may determine whether including a given component in a solution package is valid. In one embodiment, e.g., an integration tool may validate whether a provider is available in the solution being developed for each data type for which a component being added to the package has registered as a consumer. If any consumer provider relation cannot be brokered, the CIB may notify a developer (e.g., user of the integration tool). Further, in one embodiment, the CIB may suggest an available component not currently included in the solution package.

If a valid component was included, then at step 420, the CIB, or other software component (e.g., an integration tool), may provide information (e.g., a resolver string) to the software component which can be used to resolve needed or unresolved information at deployment. For example, a path name or environment variable, application property or configuration value, etc, may be used to resolve needed information.

Figure 5:
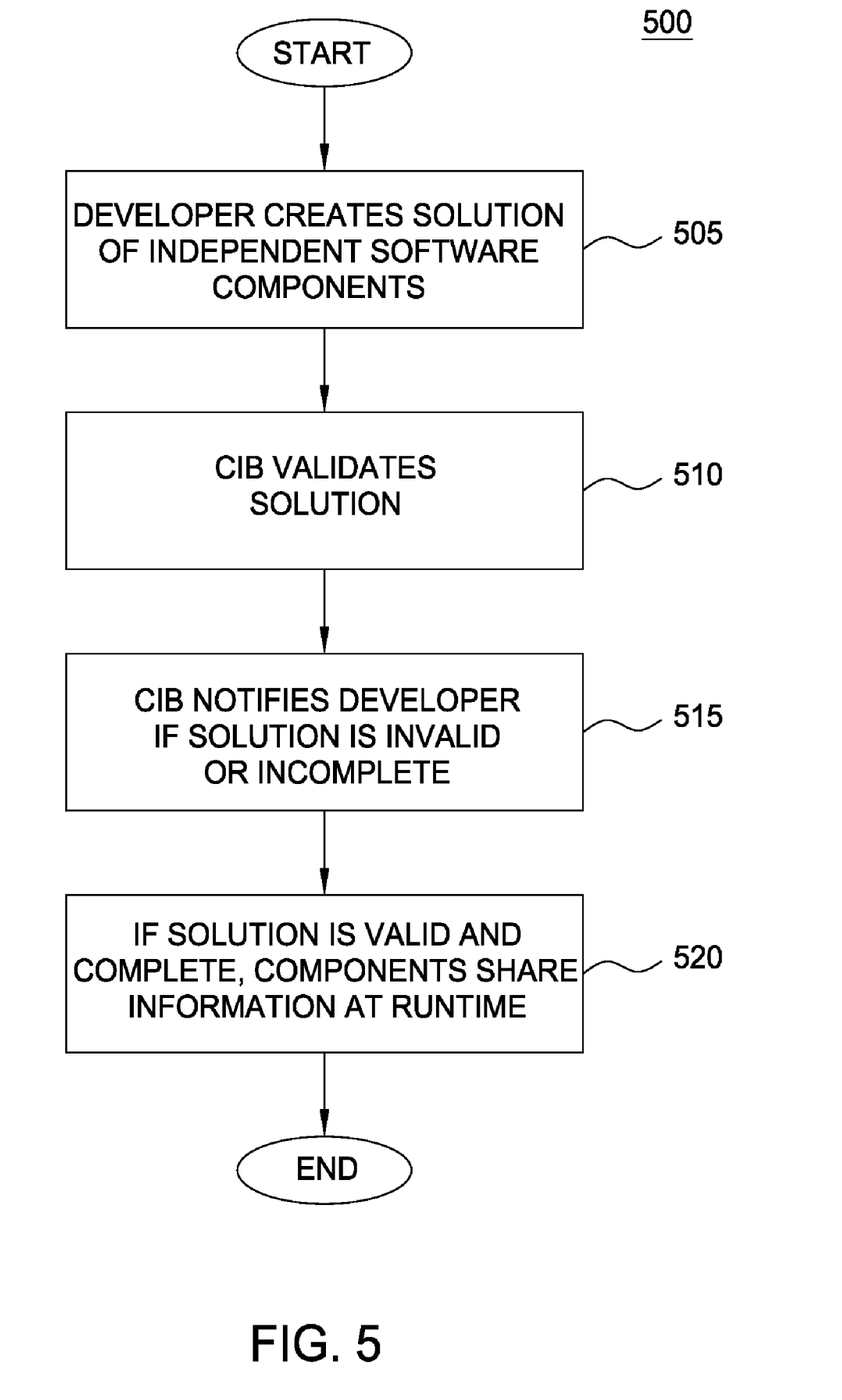
FIG. 5 is a flow diagram illustrating a method for using a component integration bus in deploying a solution, according to one embodiment of the invention.

FIG. 5 is a flow diagram illustrating a method 500 for creating an integrated, deployable solution package, according to one embodiment of the invention. As shown, method 500 begins at step 505, where a developer creates a solution package of independent software components. At step 510, the CIB, or another software component, validates the solution package. In one embodiment, the CIB may provide information about consumer-provider relationships between the software components of the solution package to an integration tool. The integration tool may use the relationship information to evaluate whether the component ordering in a solution or deployment package is valid. That is, the component ordering in a solution package determines when a specified component can resolve needed or unresolved information. For example, assume a solution package is sent to a remote system for deployment. If a component is out of order in the solution package during deployment or installation, then when that component is being configured on the remote system there is needed information that depends on unresolved information of another component yet to be configured. In such a case, the component is unable to resolve needed information, thereby creating a data dependency problem and preventing a solution from being deployable. In one embodiment, the integration tool may notify the developer of such a problem and, optionally, offer an ordering solution.

At step 520, the components in the solution package may use the information provided by the CIB at solution packaging time to resolve needed or unresolved information at runtime. In one embodiment, the components, or another software component, may use a resolver string from the CIB to resolve needed information when the solution package is deployed.

Figure 6:
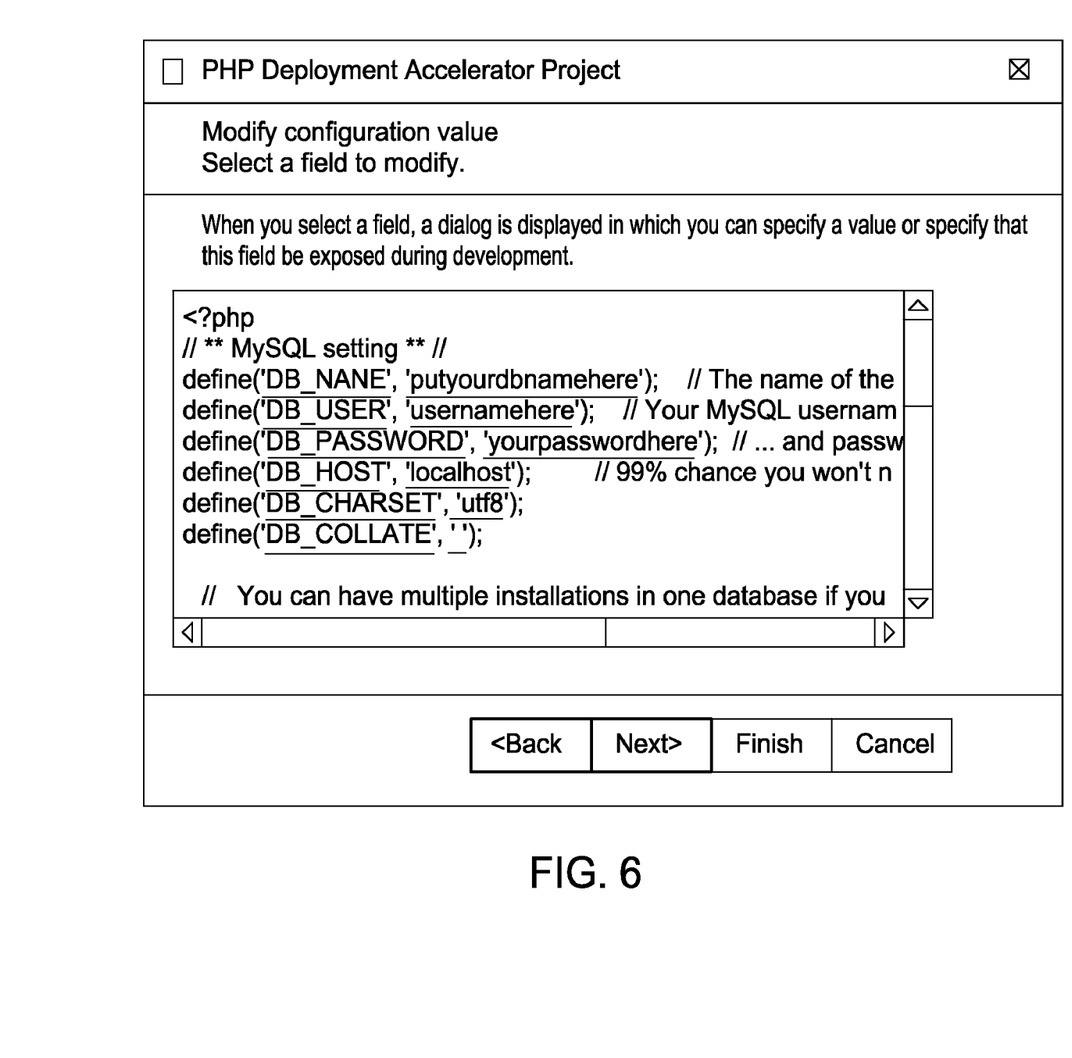
FIG. 6 is an example graphical user interface for defining a consumer-provider relationship between components in a solution package, according to one embodiment of the invention.

FIG. 6 is an example graphical user interface for defining a consumer-provider relationship between components in a solution package, according to one embodiment of the invention. As shown, FIG. 6 presents a developer with selectable fields of information needed by a PHP component in a solution package. Specifically, FIG. 6 depicts selectable fields of database configuration information, including a database name, a database username, a database password, and a database port needed by the PHP component to connect to a database when the solution package is deployed. Using the interface, the developer may select a field (e.g., 'DB_NAME') in which to provide a value or to select a provider for such information. That is, the developer may select another software component in the integrated solution (in this case a database component) used to supply the configuration values for the PHP component.

Figure 7:
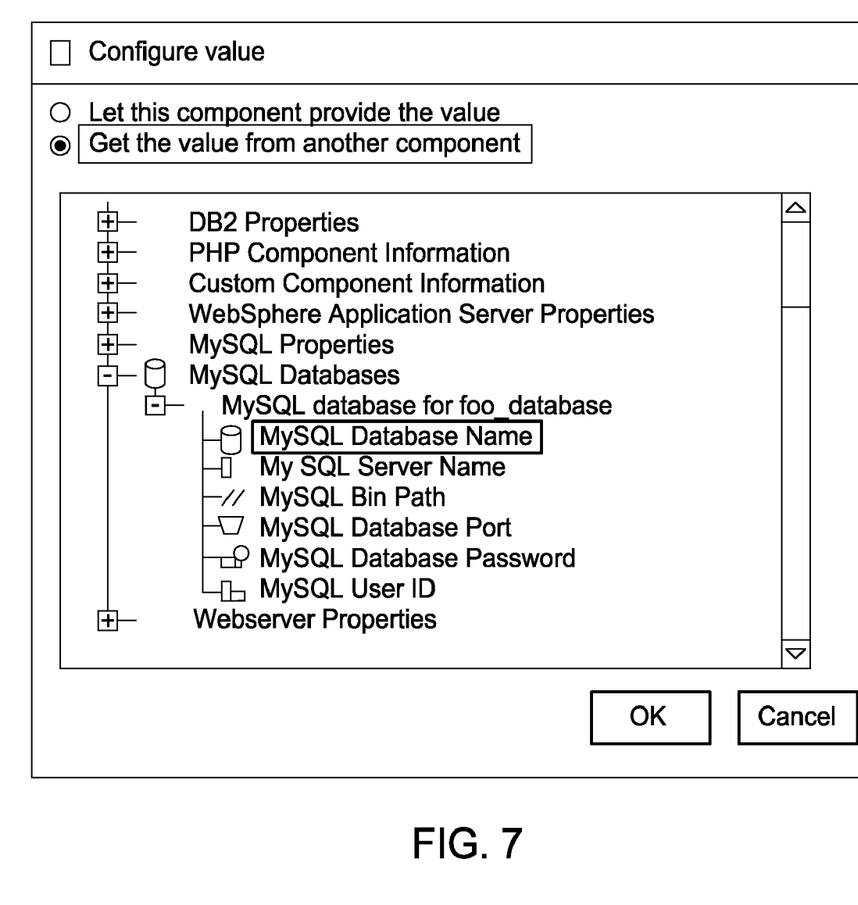
FIG. 7 is an example graphical user interface for configuring a value using a component integration bus and an integration tool, according to one embodiment of the invention.

FIG. 7 is an example graphical user interface for configuring a value using a component integration bus and an integration tool, according to one embodiment of the invention. In this example, FIG. 7 is presented to the developer after a field is selected from display of FIG. 6. As shown, the user interface presents component data that may be selected as a provider of a data type for another component. For example, assume the developer had selected the field in FIG. 6 labeled "DB_NAME." Using the interface in FIG. 7, the developer may select to resolve this required configuration data using a name of a MySQL database (i.e., the highlighted portion inside the scrollable text area of FIG. 7). In one embodiment, component information is presented for predetermined data types. That is, the CIB may recognize some common data types (e.g., WebSphere™ Application Server Properties, DB2™ Properties, MySQL™ Databases, and DB2™ Databases). Through the integration tool, the CIB may present these data types to the developer with certain data fields (e.g., MySQL™ databases include provider fields for database name, server name, binary executable path, database port, database password, and database user identity).

Further, in one embodiment, information, including metadata, provided to the CIB by software components may be used to control the presentation of component data of an integration tool. Additionally, the information provided to the CIB by software components, including metadata of component information, may be used by the integration tool to provide context sensitive data provisioning. That is, the integration tool may provide some given information in different ways for consumption based on the metadata provided by the CIB. For example, the integration tool may use the metadata to store, organize, or display the information for consumption in a more efficient manner depending on context (e.g., the type of consumer or user). In one embodiment, the integration tool may provide context sensitive data provision depending on the target deployment environment (e.g., an x86 architecture vs. an i5 architecture). That is, the integration tool may present the information for consumption tailored in different ways based on the target environment or user but the resolved information is the essentially the same.

Advantageously, embodiments of the invention provide the ability for computer systems to share unresolved information between software components when an integrated solution package which includes multiple components is deployed (and subsequently during runtime of the integrated solution). As described above, a data sharing mechanism, referred to as a "component integration bus" (CIB), may facilitate this exchange to allows entities using the CIB to establish consumer-provider relationships. For example, as described above, a PHP component may be considered a consumer entity of database configuration values because the PHP component uses or consumes the information. A database component may be considered a provider of database configuration values because the database component provides the information for the PHP component. Of course, the PHP and database components may have multiple relationships, as both providers and consumers with each other (and with a variety of other software components).

While the foregoing is directed to embodiments of the present invention, other and further embodiments of the invention may be devised without departing from the basic scope thereof, and the scope thereof is determined by the claims that follow.

What is claimed is:

1. A computer-implemented method for sharing unresolved information between software components, comprising:
    registering, with a component integration bus, a first software component as a provider of one or more predefined data types, wherein each predefined data type references runtime metadata values available from the first software component generated only once the first software component is deployed;
    registering, with the component integration bus, a second software component as a consumer of one or more predefined data types, including registering the second software component as a consumer of at least a first data type for which the first software component is registered as a provider;
    receiving a request to include at least the first software component and the second software component in an integrated solution package;
    brokering a consumer/provider relationship between the first software component and the second software component in the integrated solution package for the first data type, wherein the brokering includes generating a reference to the runtime metadata values available from the first software component when deployed; and
    integrating at least the first software component, the second software component, and the generated reference into a deployable, integrated solution package.

2. The method of claim 1, further comprising:
    deploying the integrated solution package; and
    resolving the runtime metadata values available from the first software component after deployment of the first software component for the first data type based on the generated reference.

3. The method of claim 1, wherein the runtime metadata values available from the first software component for the first data type provides configuration data available from the first software component, once deployed.

4. The method of claim 3, wherein the first software component comprises a database component and the configuration data includes database configuration data required by the second component in order to access the database component.

5. The method of claim 1, further comprising:
    receiving a request to include a third software component in the integrated solution package, wherein the third component is registered with the component integration bus as a consumer of at least a second data type; and
    upon determining that neither the first software component nor the second software component is registered as a provider of the second data type, alerting a developer that no software component in the integrated solution package is available as a provider of the second data type.

6. The method of claim 5, further comprising:
    evaluating software components registered with the component integration bus to identify a fourth software component registered as a provider of the second data type; and
    recommending the fourth software component for inclusion in the integrated solution package.

7. The method of claim 1, wherein the one or more predefined data types are described in an XML schema.

8. The method of claim 1, wherein the reference generated for the first data type is provides the runtime metadata values tailored for a target deployment environment.

9. A computer-readable storage-medium containing a program which, when executed, performs an operation for sharing unresolved information between software components, the operation comprising:
registering, with a component integration bus, a first software component as a provider of one or more predefined data types, wherein each predefined data type references runtime metadata values available from the first software component generated only once the first software component is deployed;
registering, with the component integration bus, a second software component as a consumer of one or more predefined data types, including registering the second software component as a consumer of at least a first data type for which the first software component is registered as a provider;
receiving a request to include at least the first software component and the second software component in an integrated solution package;
brokering a consumer/provider relationship between the first software component and the second software component in the integrated solution package for the first data type, wherein the brokering includes generating a reference to the runtime metadata values available from the first software component when deployed; and
integrating at least the first software component, the second software component, and the generated reference into a deployable, integrated solution package.

10. The computer-readable storage-medium of claim 9, wherein the operation further comprises:
deploying the integrated solution package; and
resolving the runtime metadata values available from the first software component after deployment of the first software component for the first data type based on the generated reference.

11. The computer-readable storage-medium of claim 9, wherein the runtime metadata values available from the first software component for the first data type provides configuration data available from the first software component, once deployed.

12. The computer-readable storage-medium of claim 11, wherein the first software component comprises a database component and the configuration data includes database configuration data required by the second component in order to access the database component.

13. The computer-readable storage-medium of claim 9, wherein the operation further comprises:
receiving a request to include a third software component in the integrated solution package, wherein the third component is registered with the component integration bus as a consumer of at least a second data type; and
upon determining that neither the first software component nor the second software component is registered as a provider of the second data type, alerting a developer that no software component in the integrated solution package is available as a provider of the second data type.

14. The computer-readable storage-medium of claim 13, wherein the operation further comprises:

evaluating software components registered with the component integration bus to identify a fourth software component registered as a provider of the second data type; and
recommending the fourth software component for inclusion in the integrated solution package.

15. A system, comprising:
a processor; and
a memory containing a program, which, when executed by the processor, performs an operation for sharing unresolved information between software components, the operation comprising:
registering, with a component integration bus, a first software component as a provider of one or more predefined data types, wherein each predefined data type references runtime metadata values available from the first software component generated only once the first software component is deployed,
registering, with the component integration bus, a second software component as a consumer of one or more predefined data types, including registering the second software component as a consumer of at least a first data type for which the first software component is registered as a provider,
receiving a request to include at least the first software component and the second software component in an integrated solution package,
brokering a consumer/provider relationship between the first software component and the second software component in the integrated solution package for the first data type, wherein the brokering includes generating a reference to the runtime metadata values available from the first software component when deployed, and
integrating at least the first software component, the second software component, and the generated reference into a deployable, integrated solution package.

16. The system of claim 15, wherein the operation performed by the program further comprises:
deploying the integrated solution package; and
resolving the runtime metadata values available from the first software component after deployment of the first software component for the first data type based on the generated reference.

17. The system of claim 15, wherein the runtime metadata values available from the first software component for the first data type provides configuration data available from the first software component, once deployed.

18. The system of claim 17, wherein the first software component comprises a database component and the configuration data includes database configuration data required by the second component in order to access the database component.

19. The system of claim 15, wherein the operation performed by the program further comprises:
receiving a request to include a third software component in the integrated solution package, wherein the third component is registered with the component integration bus as a consumer of at least a second data type; and
upon determining that neither the first software component nor the second software component is registered as a provider of the second data type, alerting a developer that no software component in the integrated solution package is available as a provider of the second data type.

20. The system of claim 19, wherein the operation performed by the program further comprises:

evaluating software components registered with the component integration bus to identify a fourth software component registered as a provider of the second data type; and recommending the fourth software component for inclusion in the integrated solution package.

* * * * *